United States Patent [19]

DeClercq et al.

[11] Patent Number: 5,266,165
[45] Date of Patent: Nov. 30, 1993

[54] PAPER SIZING USING COPOLYMERS OF LONG-CHAIN OLEFINS AND MALEIC ANHYDRIDE IN THE FORM OF THE SEMIAMIDES WITH MORPHOLINE

[75] Inventors: Arnold DeClercq, Dirmstein; Walter Denzinger, Speyer; Norbert Greif, Bobenheim; Heinrich Hartmann, Limburgerhof; Knut Oppenlaender, Ludwigshafen; Ulrich Riebeling, Schifferstadt, all of Fed. Rep. of Germany

[73] Assignee: BASF Aktiengesellschaft, Ludwigshafen, Fed. Rep. of Germany

[21] Appl. No.: 955,270

[22] Filed: Oct. 1, 1992

[30] Foreign Application Priority Data

Oct. 5, 1991 [DE] Fed. Rep. of Germany ....... 4133123

[51] Int. Cl.$^5$ ................... D21H 17/45; D21H 21/16; C08F 8/44; C08F 8/30; C08F 222/06
[52] U.S. Cl. ................... 162/168.2; 525/375; 525/196; 526/272; 162/135; 427/395
[58] Field of Search ............ 526/271, 272; 162/168.2

[56] References Cited

U.S. PATENT DOCUMENTS

| | | | |
|---|---|---|---|
| 4,065,608 | 12/1977 | Beck et al. | 526/49 |
| 4,200,559 | 4/1980 | Peterlein et al. | 524/52 |
| 4,596,863 | 6/1986 | Sackmann et al. | 526/262 |

FOREIGN PATENT DOCUMENTS

| | | |
|---|---|---|
| 412389 | 2/1991 | European Pat. Off. . |
| 2544948 | 4/1977 | Fed. Rep. of Germany . |
| 3319014 | 11/1984 | Fed. Rep. of Germany . |
| 287070 | 2/1991 | Fed. Rep. of Germany . |

Primary Examiner—Joseph L. Schofer
Assistant Examiner—Wu C. Cheng
Attorney, Agent, or Firm—Oblon, Spivak, McClelland, Maier & Neustadt

[57] ABSTRACT

Abstract of the Disclosure: Copolymers of (a) $C_{12}$- to $C_{24}$-monoolefins and (b) maleic anhydride or itaconic anhydride, having molecular weights of from 800 to 100,000 g/mol, in the form of partially or completely neutralized semiamides with morpholine, in aqueous solution or dispersion, can be used as sizes for paper.

6 Claims, No Drawings

PAPER SIZING USING COPOLYMERS OF LONG-CHAIN OLEFINS AND MALEIC ANHYDRIDE IN THE FORM OF THE SEMIAMIDES WITH MORPHOLINE

The present invention relates to a process for sizing paper using copolymers of long-chain olefins and maleic anhydride or itaconic anhydride in the form of the semiamides with morpholine.

DE-B-25 44 948 discloses a process for the preparation of cationic sizes for paper. In this process, copolymers of maleic anhydride and α-olefins of 10 to 26 carbon atoms are reacted, in an organic solvent, with aliphatic diamines which contain primary and tertiary amino groups. Up to 70 mol % of the stated amines may be replaced with an aliphatic monoamine. According to the patent, the structure of the resulting reaction products has not been exactly clarified, and said products are likely to be amides and certain amounts of imides. These reaction products are converted into a salt by adding an acid or an alkylating agent and are the actual sizes for paper. DE-A-33 19 014 discloses maleic anhydride copolymers which are prepared by copolymerizing maleic anhydride with olefins or styrene and converting the anhydride groups of the copolymers into half-ester or semiamide groups and then reacting the unconverted anhydride groups with long-chain primary monoamines to give imide groups. The copolymers thus obtained are engine sizes and surface sizes for paper.

DD-B 287 070 discloses cationic paper sizes which are an aqueous solution of reaction products of high molecular weight arylvinylmaleic anhydride copolymers with equimolar amounts of substituted diamines or of mixtures of substituted amines with ammonia and/or primary amines and volatile acids, such as formic acid or acetic acid.

EP-A-0 412 389 discloses the use of copolymers of long-chain olefins and ethylenically unsaturated dicarboxylic anhydrides as agents for rendering leather and pelts water-repellent. The preparation solutions are obtainable by polymerizing
 (a) $C_8$- to $C_{40}$-monolefins with
 (b) ethylenically unsaturated $C_4$- to $C_8$-dicarboxylic anhydrides
by a mass polymerization method at from 80° to 300° C. to give copolymers having molecular weights of from 500 to 20,000 g per mol, then solvolyzing the anhydride groups of the copolymers, for example by adding alcohols or primary and/or secondary amines, and partially neutralizing the carboxyl groups of the copolymers, which groups are formed in the solvolysis, with bases in an aqueous medium.

It is an object of the present invention to provide sizes for paper which have a better sizing effect than known paper sizes based on maleic anhydride copolymers.

We have found that this object is achieved, according to the invention, by the use of copolymers of
 (a) $C_{12}$- to $C_{40}$-monoolefins and
 (b) maleic anhydride or itaconic anhydride
having molecular weights of from 800 to 100,000 g/mol, in the form of semiamides with morpholine, which have been partially or completely neutralized with alkali metal bases, alkaline earth metal bases, ammonia or amines, in aqueous solution or dispersion as sizes for paper.

Copolymers to be used according to the invention may be prepared, for example, by known processes of solution and precipitated polymerization according to U.S. Pat. No. 4,959,077 and mass polymerization according to the abovementioned EP-A-0 412 389, by copolymerizing the monomers (a) with the monomers (b) under the action of free radical polymerization initiators.

Suitable monomers of group (a) are $C_{12}$- to $C_{40}$-monoolefins, preferably $C_{16}$- to $C_{30}$-monoolefins. Examples of such olefins are dodec-1-ene, tetradec-1-ene, hexadec-1-ene, octadec-1-ene, 1-$C_{20}$-olefin, 1-$C_{22}$-olefin, 1-$C_{24}$-olefin, 1-$C_{20}$- to $C_{24}$-olefin, 1-$C_{24}$- to $C_{28}$-olefin, 1-$C_{30}$-olefin, 1-$C_{35}$-olefin and 1-$C_{40}$-olefin. The olefins or mixtures of olefins are commercial products which preferably consist of α-olefins. The olefins may contain small amounts of inert organic hydrocarbons from the preparation, for example not more than about 5% by weight. They are usually used in the copolymerization in the commercially available quality. They need not be subjected to any special purification.

Suitable components (b) are maleic anhydride and itaconic anhydride and mixtures of these anhydrides. Maleic anhydride is preferably used in the copolymerization. The copolymers obtained in the copolymerization have molecular weights of from 800 to 100,000, preferably from 1,000 to 20,000, g/mol. They are obtainable by polymerizing the monomers (a) and (b) in a molar ratio of from 1.1:1 to 1:1. The monomers (a) and (b) are preferably polymerized in a molar ratio of 1:1, or only a 1% strength excess of monomers of component (a) is used. The monomers of group (a) and (b) are known to form alternating copolymers which have high molecular weights and contain 50 mol % of each of the monomers (a) and (b) as polymerized units. When the copolymers have very low molecular weights, it is possible, depending on the type of terminal groups, for there to be a deviation from the molar ratio in the abovementioned range, for example if the copolymer chain starts with the monomer (a) and also terminates with the monomer (a).

The copolymers are preferably prepared by the mass polymerization method at from 80° to 300° C. This method is described in detail in EP-A-0 412 382. The preparation of the partially or completely neutralized semiamides of the copolymers is therefore preferably carried out by free radical copolymerization of
 (a) $C_{12}$- to $C_{40}$-monoolefins and
 (b) maleic anhydride or itaconic anhydride
by a mass polymerization method at from 80° to 300° C. to give copolymers having molecular weights of from 800 to 100,000 g/mol, subsequent amidation of the anhydride groups of the copolymers with morpholine to give semiamides and partial or complete neutralization of the semiamides in an aqueous medium with an alkali metal base, an alkaline earth metal base, ammonia or an amine or preferably with morpholine. The amidation of the copolymers containing anhydride groups is preferably carried out by adding morpholine to the melt of the copolymers obtainable by mass polymerization, so that from 10 to 50 mol % of the total number of carboxyl groups formed from the polymerized monomers (b) are amidated with morpholine.

The copolymers described above, which were in the form of partially or completely neutralized semiamides with morpholine in aqueous solution or dispersion, are used as surface sizes and engine sizes for paper. The concentration of the dispersion or solution of the partially or completely neutralized copolymer amidated with morpholine is preferably from 10 to 55% by weight. The pH is usually from 4 to 9. In the case of the surface sizing of paper, the solution and dispersion of the copolymer partially or completely neutralized and converted to an extent of from 10 to 50% into the semiamide with morpholine is brought, by adding water, into a total polymer concentration which is usual for preparation solutions for sizing paper, for example to a polymer content of from 0.05 to 3.0% by weight. The amount of copolymer which is applied to the paper for sizing purposes is, as a rule, from 0.02 to 1.5, preferably from 0.1 to 0.8, % by weight, based on dry fibers. For the production of the preparation solution, the dispersions are diluted by adding water. In addition to the amidated copolymers to be used according to the invention and partially or completely neutralized with morpholine, the preparation solutions may also contain further assistants, for example starch for increasing the strength of the paper, wet and dry strength agents based on synthetic products, stocks and wax emulsions.

In the case of surface sizing, the preparation solutions are as a rule applied with the aid of a size press. It is of course also possible to apply the preparation solutions to the paper web by spraying or immersion or, for example, with the aid of a ductor. The paper treated with preparation solution is then dried on a steam-heated cylinder having a surface temperature of 90° C. Sizing is complete after the drying process.

The partially or completely neutralized copolymers obtained from long-chain olefins and maleic anhydride and/or itaconic anhydride and amidated with morpholine can also be used as engine sizes. The amounts which can be used for this purpose are of the same order of magnitude as for surface sizing. When used as engine sizes, it is preferable to carry out the process in the presence of fixing agents and/or alum.

The copolymers to be used according to the invention may furthermore be employed in combination with the fatty alkyldiketene emulsions usually used as sizes. Here it is possible to adopt a procedure in which the copolymer solutions or dispersions to be used according to the invention are mixed with the diketene emulsion, and the mixture is added to the paper stock. In another embodiment of the engine sizing of paper, the copolymer solution or dispersion to be used according to the invention is first added to the paper stock, followed by the diketene emulsion, the paper stock is thoroughly mixed and a sheet is formed. In another process variant, the diketene emulsion is first metered into the paper stock and the size preparation to be used according to the invention is then added. When mixtures of diketene and the sizes to be used according to the invention are employed, the amount of said sizes is from 5 to 50, preferably from 15 to 30, % by weight. The same amounts are also used in the case of separate metering of diketene and size preparation to be used according to the invention. All conventional fatty alkyldiketene emulsions may be components of the size combination, for example palmityl-, stearyl- and behenyldiketene or mixtures of the stated diketenes.

In the Examples which follow, parts and percentages are by weight, unless stated otherwise. The degree of sizing of the papers was determined with the aid of the Cobb value according to DIN 53,132. The efficiency of the copolymer dispersions to be used according to the invention as sizes was determined with the aid of a paper which had the following composition:

50% of bleached sulfite pulp,
50% of bleached sulfate pulp,
30%, based on dry pulp, of china clay and
1%, based on dry paper, of alum.

This paper is referred to below as test paper A. It was unsized in the pulp and had a basis weight of 70 g/m². The freeness was 25° SR (Schopper-Riegler) and the ash content was 18%. The preparation solutions each contained 2.5 g/l or 4 g/l of the copolymer to be used according to the invention, based on the solids content of the dispersions, and 60 g/l of an oxidatively degraded starch having a viscosity $\eta_i$ of 0.36 dl/g. The degree of neutralization of the sizes was 100% in all cases. The liquor pickup was in all cases 90%, based on dry paper.

Preparation of the Sizes

Size 1

An alternating copolymer of a 1-$C_{20}$- to $C_{24}$-olefin mixture and maleic anhydride is prepared by the preparation method stated in EP-A-0 412 389 for dispersion I. 87 parts of morpholine are slowly added at from 120° to 140° C. to 406 parts of the resulting maleic anhydride copolymer with a molecular weight of 4,500 g/mol. After the addition of the morpholine, the reaction mixture is stirred for a further hour at 140° C. and then cooled to room temperature. 50 mol % of the polymerized maleic anhydride units were amidated with morpholine.

59.2 parts of the copolymer amidated with morpholine are emulsified in a mixture of 8.2 parts of concentrated ammonia solution and 2.39 parts of water in an emulsifying apparatus (Turax). A 19.5% strength low-viscosity dispersion is obtained.

Size 2

54.2 parts of the amidated copolymer described for the preparation of size 1 are emulsified in an aqueous solution of 9.6 parts of morpholine in 255 parts of water with the aid of an emulsifying apparatus. An aqueous dispersion having a solids content of 18.1% is obtained.

Size 3

49.3 parts of the copolymer amidated with morpholine and used for the preparation of size 1 are emulsified in an aqueous solution of 14.9 parts of triethanolamine and 257 parts of water. A low-viscosity dispersion having a solids content of 17.5% is obtained.

Size 4

The copolymer of a $C_{20}$- to $C_{24}$-olefin and maleic anhydride, amidated with morpholine and described for the preparation of size 1, is 100% neutralized in a mixture of ethylenediamine and water. The solids content of the dispersion thus obtained is 18.5%.

Size 5

The maleic anhydride copolymer amidated with morpholine and described for the preparation of size 1, is neutralized with a solution of diethylenetriamine in water so that the carboxyl groups of the morpholine semiamides of the copolymers are 100% neutralized with diethylenetriamine.

Size 6

The maleic acid copolymer described for the preparation of size 1 and amidated with morpholine is emulsified in an aqueous solution of N-ethylpiperazine. 100% neutralization of the carboxyl groups of the morpholine semiamides of the copolymers with N-ethylpiperazine is carried out simultaneously.

Preparation solutions which contain 2.5 g/l and 4 g/l of the copolymer to be used according to the invention, in amidated neutralized form, and 60 g/l of an oxidatively degraded starch are then prepared from the sizes 1 to 6 described above. The sizing values obtained with the abovementioned test paper A are shown in the Table below.

TABLE

| Example | Size | Cobb value [g/m$^2$] at a concentration of the preparation solution of | |
|---|---|---|---|
| | | [2.5 g/l] | [4 g/l] |
| 1 | 1 | 23 | 17 |
| 2 | 2 | 26 | 17 |
| 3 | 3 | 24 | 17 |
| 4 | 4 | 25 | 18 |
| 5 | 5 | 27 | 19 |
| 6 | 6 | 26 | 17 |

COMPARATIVE EXAMPLE

An α-olefin mixture of $C_{20}$- to $C_{24}$-olefins is first copolymerized with maleic anhydride according to Example 5 of DE-B-2 544 948 and then reacted, as stated there, with N,N-dimethylpropane-1,3-diamine, then with benzyl chloride and thereafter with ethanolamine and diethylenetriamine, and acetic acid is added. Preparation solutions which contain 2.5 g/l and 4.0 g/l of the copolymer and 60 g/l of oxidatively degraded starch are then prepared. The test paper A is sized with both solutions. The test paper A has a Cobb value of 55 g/m$^2$ at a preparation solution concentration of 2.5 g/l, and a Cobb value of 43 g/m$^2$ at a preparation solution concentration of 4 g/l.

We claim:

1. A process for the engine and surface sizing of paper, which comprises:
    applying to said paper a copolymer of (a) a $C_{12}$–$C_{40}$-alpha-monoolefin and (b) maleic anhydride or itaconic anhydride, said copolymer having a molecular weight of from 800–100,000 g/mol and being in the form of a semiamide prepared by reaction of morpholine with the copolymer, the carboxyl groups of the semiamide copolymer being partially or completely neutralized with an alkali metal base, an alkaline earth metal base, ammonia or an amine, in aqueous solution or dispersion.

2. A process as claimed in claim 1, wherein the partially or completely neutralized semiamide of the copolymer is obtained by free radical copolymerization of
    (a) $C_{12}$- to $C_{40}$-monoolefins and
    (b) maleic anhydride or itaconic anhydride
by a mass polymerization method at from 80° to 300° C. to give a copolymer having a molecular weight of from 800 to 100,000 g/mol, subsequent amidation of the anhydride groups of the copolymer with morpholine to give the semiamide and partial or complete neutralization of the semiamide in an aqueous medium with a base.

3. A process as claimed in claim 2, wherein the amidation is carried out by adding morpholine to a melt of the copolymer obtained by mass polymerization, so that from 10 to 50 mol % of the total number of carboxyl groups formed from the polymerized monomers (b) are amidated with morpholine.

4. A process as claimed in claim 1, wherein the carboxyl groups of the morpholine semiamide of the copolymer are neutralized to an extent of not less than 10 mol % with morpholine.

5. A process as claimed in claim 5, wherein the copolymer has a molecular weight ranging from 1000–20,000 g/mol.

6. A process as claimed in claim 5, wherein said $C_{12}$–$C_{40}$-alpha-monoolefin is dodec-1-ene, tetradec-1-ene, hexadec-1-ene, octadec-1-ene, a 1-$C_{20}$-olefin, a 1-$C_{22}$-olefin, a 1-$C_{24}$-olefin, a 1-$C_{20}$ to $C_{24}$-olefin, a 1-$C_{24}$ to $C_{28}$-olefin, a 1-$C_{30}$-olefin, a 1-$C_{35}$-olefin or a 1-$C_{40}$-olefin, or mixtures thereof.

* * * * *